(12) United States Patent
Vinogradov et al.

(10) Patent No.: US 7,155,554 B2
(45) Date of Patent: Dec. 26, 2006

(54) METHODS AND APPARATUSES FOR GENERATING A SINGLE REQUEST FOR BLOCK TRANSACTIONS OVER A COMMUNICATION FABRIC

(75) Inventors: Glenn S. Vinogradov, Philadelphia, PA (US); Drew E. Wingard, San Carlos, CA (US)

(73) Assignee: Sonics, Inc., Mountain View, CA (US)

( * ) Notice: Subject to any disclaimer, the term of this patent is extended or adjusted under 35 U.S.C. 154(b) by 83 days.

(21) Appl. No.: 10/980,844

(22) Filed: Nov. 2, 2004

(65) Prior Publication Data

US 2006/0095621 A1    May 4, 2006

(51) Int. Cl.
G06F 13/14    (2006.01)
G06F 13/00    (2006.01)
G06F 13/36    (2006.01)
G06F 15/16    (2006.01)
H04L 12/28    (2006.01)
H04L 12/66    (2006.01)

(52) U.S. Cl. .................. 710/305; 710/100; 710/112; 710/308; 710/314; 709/213; 709/230; 709/201; 370/352; 370/395.2; 370/396; 370/398; 455/226.1; 455/570

(58) Field of Classification Search .............. 700/2, 700/3, 4, 5, 7, 17–18, 83; 710/305, 308, 710/309, 313–314, 100, 112; 709/213, 230, 709/201; 370/278, 396, 398, 395.2, 352; 455/226.1, 570
See application file for complete search history.

(56) References Cited

U.S. PATENT DOCUMENTS

| 5,699,460 | A | * | 12/1997 | Kopet et al. ............... 382/307 |
| 5,799,203 | A | | 8/1998 | Lee et al. |
| 5,948,089 | A | | 9/1999 | Wingard et al. |
| 6,182,183 | B1 | * | 1/2001 | Wingard et al. ............. 710/305 |
| 6,330,283 | B1 | * | 12/2001 | Lafe ....................... 375/240.18 |
| 6,393,500 | B1 | | 5/2002 | Thekkath |
| 6,678,423 | B1 | * | 1/2004 | Trenary et al. .............. 382/250 |
| 6,725,313 | B1 | * | 4/2004 | Wingard et al. ............. 710/305 |
| 6,785,753 | B1 | | 8/2004 | Weber et al. |
| 2002/0038393 | A1 | | 3/2002 | Ganapathy et al. |
| 2002/0107903 | A1 | * | 8/2002 | Richter et al. .............. 709/201 |
| 2002/0161848 | A1 | * | 10/2002 | Willman et al. ............. 709/213 |
| 2003/0099254 | A1 | * | 5/2003 | Richter ...................... 370/466 |
| 2003/0191884 | A1 | | 10/2003 | Anjo et al. |

(Continued)

FOREIGN PATENT DOCUMENTS

EP    1 179 785 A    2/2002

(Continued)

OTHER PUBLICATIONS

Culler, David E.: "Split-Phase Busses," CS 258, Computer Science Division, U.C. Berkeley, Spring 1999, pp. 1-23.

Primary Examiner—Ramesh Patel
(74) Attorney, Agent, or Firm—Blakely, Sokoloff, Taylor & Zafman LLP

(57) ABSTRACT

Embodiments of apparatuses, systems, and methods are described for communicating information between functional blocks of a system across a communications fabric. A first functional block communicates a single request fully describing attributes of a two-dimensional data block across the communication fabric to a second functional block capable of decoding the single request to obtain the attributes of the two-dimensional data block. At least one of the functional blocks transmits data associated with the single request across the communication fabric.

27 Claims, 10 Drawing Sheets

U.S. PATENT DOCUMENTS

| | | |
|---|---|---|
| 2003/0212743 A1 | 11/2003 | Masri et al. |
| 2004/0017820 A1 | 1/2004 | Garinger et al. |
| 2005/0210164 A1 | 9/2005 | Weber et al. |
| 2005/0216641 A1 | 9/2005 | Weber et al. |
| 2006/0092944 A1 | 5/2006 | Wingard et al. |
| 2006/0095635 A1 | 5/2006 | Vinogradov et al. |

FOREIGN PATENT DOCUMENTS

| | | |
|---|---|---|
| JP | 63 296158 A | 12/1988 |

* cited by examiner

METHODS AND APPARATUSES FOR GENERATING A SINGLE REQUEST FOR BLOCK TRANSACTIONS OVER A COMMUNICATION FABRIC

TECHNICAL FIELD

Embodiments of the present invention pertain to the field of communication fabrics, and, more particularly, to a shared interconnect in a system on a chip.

BACKGROUND

In classical bus-based architectures, communications between on-chip cores use a blocking protocol. Specifically, while a transfer is underway between an initiator and a target, the bus resources are not available for any other transfers to occur.

Additionally, most of the conventional bus architectures mainly support burst transactions with incrementing address sequences. Many applications naturally require support of the bursts with non-incrementing address sequences for improved efficiency and reduced latency. A series of one or more read requests may be in a burst request.

For example, cache replacement procedures in various computational devices including CPU's, Digital Signal Processor's, and Media Processors are often optimized to fetch the critical word first (CWF) from the memory sub-system. Common algorithms for implementing CWF supported by many CPU's and DRAM devices are WRAP and XOR bursts.

Digital Multimedia applications, which include video compression and decompression, graphics rendering, image manipulation and rasterization, are characterized by extensive access to shared memory devices, requiring high bandwidth and efficiency in the on-chip communication fabric connecting the application IP cores to the memory system. They are also often characterized by organizing their data in memory as rectangular blocks that are processed by an applications as a single unit.

For example, MPEG-2 compression and decompression algorithms operate on rectangular units called macro-blocks. Modern graphics devices displaying text manipulate on rectangular units called fonts. Communicating these blocks across traditional bus structures as a series of multiple independent short incrementing bursts can detrimentally impact system performance due to the high overhead of request bandwidth and undetermined temporal proximity of accesses to the data blocks that may be stored in the spatial proximity of the same page of the memory device.

SUMMARY

Embodiments of apparatuses, systems, and methods are described for communicating information between functional blocks of a system across a communication fabric. A first functional block communicates a single request fully describing attributes of a two-dimensional data block across the communication fabric to a second functional block capable of decoding the single request to obtain the attributes of the two-dimensional data block. At least one of the functional blocks transmits data associated with the single request across the communication fabric.

Other features and advantages of the present invention will be apparent from the accompanying drawings and the detailed description that follows.

BRIEF DESCRIPTION OF THE DRAWINGS

Embodiments of the present invention are illustrated by way of example and are not intended to be limited by the figures of the accompanying drawings, in which.

DETAILED DESCRIPTION

Figure 1A:
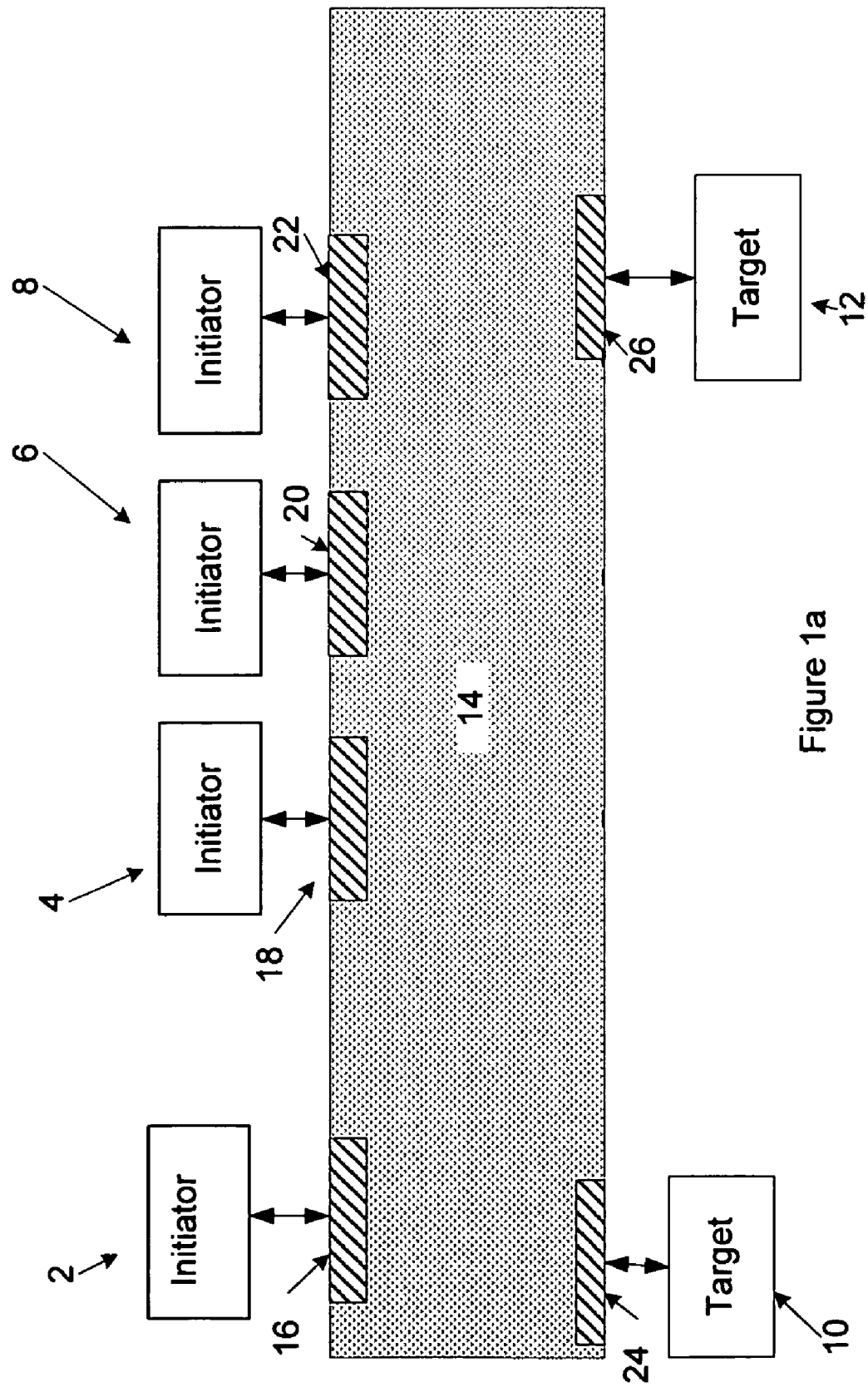
FIG. 1a illustrates a block diagram of an embodiment of a communication fabric with translation intelligence coupled to the communication fabric.

In the following detailed description, numerous specific details are set forth in order to provide a thorough understanding of the invention. However, it will be understood by those skilled in the art that certain embodiments of the present invention may be practiced without these specific details. In other instances, well-known methods, procedures, components, and circuits have not been described in detail so as to not obscure the presented embodiments of the invention. The following detailed description includes several network adapters, which will be described below. These network adapters may be implemented by hardware components, such as logic, or by a combination of hardware and software. The term data response and response packets should both be construed to be responses. The term request and request packets should both be construed to be requests. A transaction may be a complete unit of data communication that is composed of one or more requests and one or more associated responses. In a write transaction, the direction of data transmission is the same as the associated requests. In a read transaction, the direction of data transmission is the same as the associated responses. The purpose of a transaction may be to move data between functional blocks. The association between the one or more requests that form a transaction may be based on transferring one or more data words between the same initiator and target wherein the one or more data words have a defined address relationship. A single request may be associated with the transfer of one or more data words. Similarly, a single response may be associated with the transfer of one or more data words. A write transaction may move data from an initiator to a target, in the same direction as the request. A read transaction may move data from a target to an initiator, in the same direction as the response. The number of requests and the number of responses that form a transaction may be the same, or there may be more requests than responses, or there may be more responses than requests. A request may be transferred as part of a transaction. The communication fabric may use coupled resources for transmitting requests and responses. Alternately, the communication fabric may use separate resources for transmitting requests and responses. An on-chip interconnect may be a collection of mechanisms that may be adapters and/or other logical modules along with interconnecting wires that facilitate address-mapped and arbitrated communication between multiple functional blocks on an SOC (System-on-Chip). A burst may be a set of transfers that are linked together into a transaction having a defined address sequence and number of transfers. A single (non-burst) request on an interface with burst support may be encoded as a request with any legal burst address sequence and a burst length of 1.

Apparatuses, systems, and methods are described for communicating information between functional blocks across a communication fabric. Translation intelligence connects to a communication fabric. The translation intelligence may include detection and conversion logic. The detection logic detects for a read request containing burst information that communicates one or more read requests in a burst from an initiator Intellectual Property (IP) core that are going to related addresses in a single target IP core. The conversion logic converts the one or more read requests to a single request with annotations in a field of the request to indicate how many read requests were combined and the addresses associated with each read request based upon the addresses in the target IP core being related. The series of burst transactions, such as a non-incrementing address pattern burst transaction may be indicated as a block transaction. A request generated for the block transaction includes annotations indicating a length of a raster line occupied by a target data, a number of rows of raster lines occupied by the target data, and address spacing between two consecutive raster lines occupied by the target data. The conversion logic converts the one or more read requests to a single request with annotations in a field of the request to indicate how many read requests were combined and the addresses associated with each read request based upon the addresses in the target IP core being related. If the block transaction is for two-dimensional data then the single request packet also includes 1) a width of the two-dimensional object, 2) a height of the two-dimensional object measured in the number of rows that the two-dimensional object will occupy, and 3) a stride of the two-dimensional object is measured in the address spacing between the addresses of two consecutive raster lines.

FIG. 1a illustrates a block diagram of an embodiment of a communication fabric with translation intelligence coupled to the communication fabric. The system may include a plurality of initiators 2–8, a plurality of targets 10–12, and a communication fabric 14. Information between the functional blocks 2–12 is communicated across the communication fabric 14, such as an interconnect, a bus, a network on a chip, or similar communication structure in a system. Translation intelligence 16–26 connects to the communication fabric 14. A request from an initiator, such as the first initiator 2, may be communicated to a target, such as the first target 12, over the communication fabric 14 to solicit one or more responses from the target. The request and the one or more responses form a transaction. The transfer of the request and the one or more responses may be split by communicating the one or more responses to the initiator when the one or more responses become available without the initiator having to poll for the communicated responses or block the communication fabric 14 waiting for a transmission of the one or more responses. The initiator is decoupled from the waiting on the one or more responses to the issued request because the initiator may issue additional requests prior to receiving the one or more responses. The initiator is decoupled from the waiting on the one or more responses to the issued request because the initiator may relinquish control of the communication fabric 14 prior to receiving the response.

The translation intelligence 16–26 may include detection logic and conversion logic. The detection logic detects for a read request containing burst information that communicates one or more read requests in a burst transaction from an initiator, such as an Intellectual Property (IP) core, that are going to related addresses in the single target. Thus, the translation logic may detect for a burst transaction communicating either an incrementing address burst transaction or a non-incrementing address pattern burst transaction. The conversion logic converts the one or more read requests in the burst transaction to a single request with annotations in a field of the request to indicate how many read requests were combined and the address sequence associated with the transaction. The detection logic communicates to the conversion logic that the burst information is detected. Alternatively, the detection logic converts the one or more read requests to the single request with annotations if an address of the target indicates that it is capable of decoding the annotations in the single request.

The translation intelligence on the target side includes conversion logic to convert the single request with annotations into an original number of read requests, where each read request has its original target address.

A high level protocol implemented by the translation intelligence 16–26 may provide significant performance enhancements, such as the decoupling of the request from an initiator from the one or more solicited responses from a target, converting one or more read requests in a burst transaction to a single request with annotations, as well as feature-set enrichment, specifically in regards to non-incrementing (2-dimensional block, wrap, XOR) burst sequences. The high level protocol may be implemented on top of an underlining transaction level protocol implemented by an existing communication fabric. In an embodiment, the translation intelligence implements a higher level protocol layered on top of an underlining protocol and the communication fabric. The underlining protocol and communication fabric may implement either 1) a protocol that blocks the communications fabric during a time between transmission of a request and a transmission of an associated response, 2) a protocol that polls a responding block to solicit a response to an issued request, or 3) a protocol that only transfers data in the same direction as requests across the communication fabric. Thus, the existing communication fabric may be a polling, a blocking and/or write only type communication fabric. However, the high level protocol cooperates with the existing polling and/or blocking transaction level layered protocol to provide the above significant performance enhancements as well as feature-set enrichment. Thus, the translation intelligence adds a capability to do something the underlining protocol was not capable of when the underlining protocol and communication fabric was originally designed.

In an embodiment, the translation intelligence 16–22 coupled to the initiators may convert one or more burst read requests from an initiator to a single request packet write. The translation intelligence 24–26 coupled to the target may convert the single request packet write back to one or more burst read requests. The translation intelligence 24–26 coupled to the target may convert the burst read responses to response packet writes. The translation intelligence 16–22 coupled to the initiator may convert the response packet writes back to burst read responses solicited by the original burst read requests.

The translation logic converts one initiator transaction into two or more write transactions and then transmits the write transactions using the underlining protocol of the communication fabric so that the communication fabric does not block or poll for responses, and that data may be transferred in a direction opposite from the initiator transaction request.

Note, generally protocols that only transfer data in the same direction as requests across the communication fabric are, for example, a write only network, a packet based network, and other similar networks. A write only network has two separate ports. The first port only issues write type transactions. The second port only receives write type transactions. The interface does not receive read requests or responses. Some communication systems have one input/output port that issues and receives both Read and Write transactions.

The first initiator may then communicate a single request fully describing attributes of a two-dimensional data block across the communication fabric to a target to decode the single request. The single request may contain annotations indicating a length of a row occupied by a target data, a number of rows occupied by the target data, and an address spacing between two consecutive rows occupied by the target data. Address spacing between two consecutive rows can be 1) a length difference between the starting addresses of two consecutive row occupied by the target data, 2) a difference between an end of a previous rows to the beginning of next row or 3) similar spacing.

Transmitting all of this information in a single two-dimensional block request provides additional efficiency of temporal proximity important to efficient accesses to off-chip DRAM-type memory devices that may be SDRAM, DDR SDRAM, DDR2-SDRAM, etc. Annotating the initial target address of the transaction to the early request phase of the transaction provides additional efficiency by communicating the locality information to the memory subsystem before the remaining attributes arrive during the later data phase of the transaction.

Figure 1B:
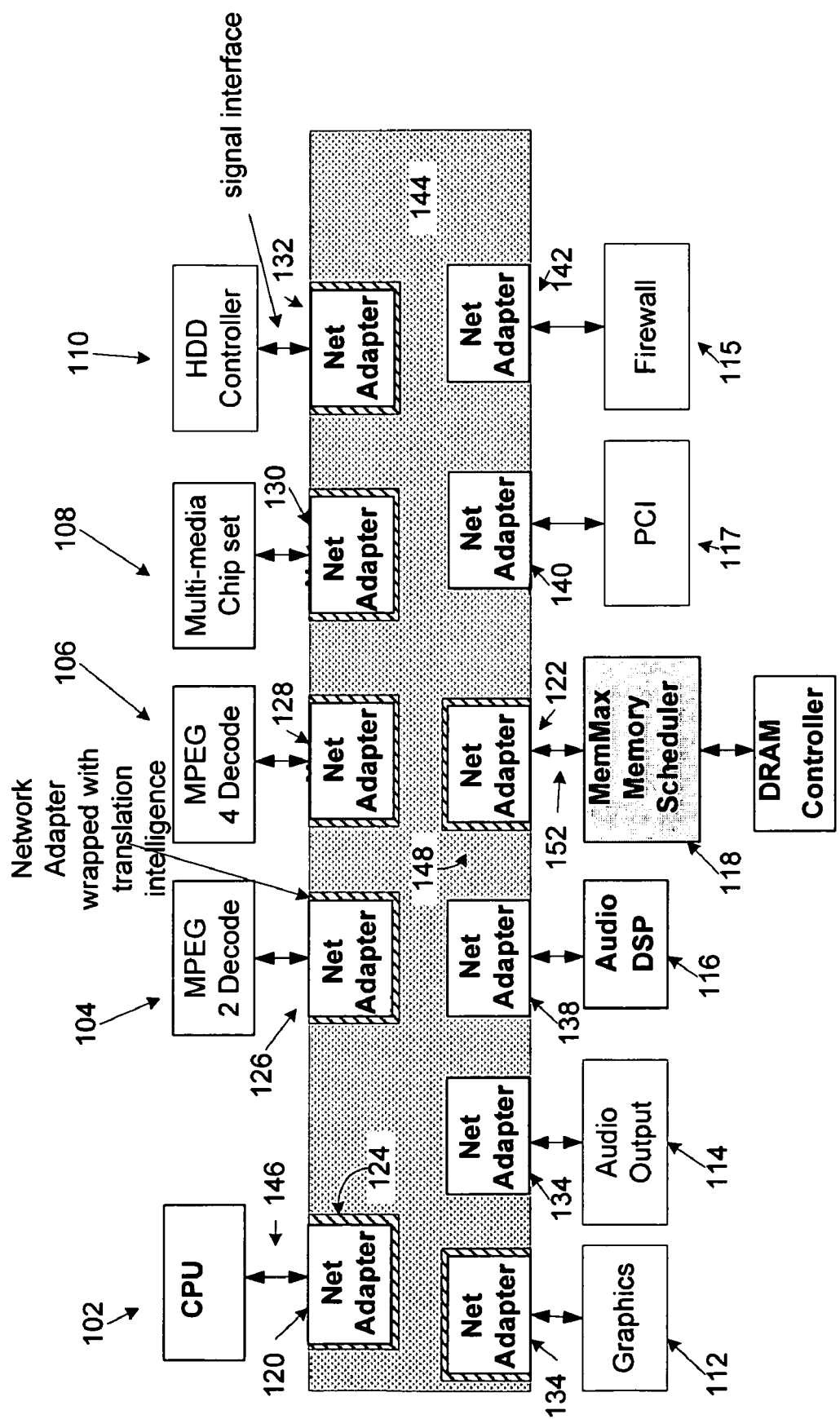
FIG. 1b illustrates a block diagram of an embodiment of a shared interconnect with intelligent network adapters coupled to the shared interconnect.

FIG. 1b illustrates a block diagram of an embodiment of a shared interconnect with intelligent network adapters coupled to the shared interconnect. A plurality of initiator Intellectual Property (IP) cores 102–118 may couple to a corresponding network adapter via a signal interface. An IP core may be a discrete wholly integrated functional block of logic that performs a particular function, such as a memory component, a wireless transmitter component, a Central Processing Unit (CPU) 102, Digital Signal Processors 116, hardware accelerators such as Moving Pictures Experts Group video compression components 104 and 106, Direct Memory Access components 118, etc. for a system on a chip (SOC). Initiator Intellectual Property (IP) cores on the SOC may be CPUs 102, multimedia chip sets 108, etc. Some of the network adapters will be initiator network adapters, such as the first network adapter 120. Some of the network adapters will be target network adapters, such as the second network adapter 122. Target IP cores may be Memory Schedulers 118, PCI bus controllers 120, etc. Translation intelligence may be wrapped around a typical distributed network adapter connected to the shared interconnect such as the translation intelligence 124 wrapped around the first network adapter 120. The translation intelligence 124 may be added as an initiator bridge module with translation intelligence and/or a target bridge module with translation intelligence.

Note the described communication mechanism and network adapters may be used for any communication fabric but a shared interconnect 144 will be used as an example shared resource. The two or more network adapters 120–142, such as bridge modules with translation intelligence, connect to the communication fabric to form a distributed arbitration mechanism for access to the shared resource.

The underlining protocol and communication fabric may implement either 1) a polling based protocol that solicits responses to an issued request over the communication fabric, 2) a blocking based protocol that blocks the communication fabric waiting for the one or more responses to become available for consumption by an initiator functional block, or 3) a write-only type network. The translation intelligence wrapped around the network adapters adds a capability to do something the underlining protocol was not capable of when the underlining protocol and communication fabric was originally designed. The translation intelligence implements a higher level protocol layered on top of the underlining protocol and the communication fabric. The translation intelligence separates the transaction of the issued request from the responses by communicating the responses to the initiator when the responses become available without the initiator having to poll for the communicated responses. The translation intelligence may also combine multiple initiator read requests into a single write type request that carries the number of the multiple requests that are combined and an address sequence associated with the multiple requests.

In operation, a first initiator IP core 102 may generate a read request with additional pieces of information including a burst length and a burst sequence. A burst length communicates that multiple read requests in this burst are coming from this same initiator IP core and are going to related addresses in a single target IP core. A burst type communicates the address sequence within the target IP core. The burst type may indicate that the request is for a series of incrementing addresses or non-incrementing addresses but a related pattern of addresses such as a block transaction. The burst sequence may be for non-trivial 2-dimensional block, wrap, xor or similar burst sequences. If the block transaction is for two-dimensional data then the request also includes 1) a width of the two-dimensional object measured in the length of the row (such as a width of a raster line), 2) a height of the two-dimensional object measured in the number of rows the two-dimensional object will occupy, and 3) a stride of the two-dimensional object that is measured in the address spacing between two consecutive rows.

The first initiator IP core 102 communicates multiple read requests across a first signal interface 146 to the first initiator network adapter 120 connected to the shared interconnect. The Initiator IP cores communicate to the shared interconnect 144 with intelligent network adapters 120–142 through signal interfaces, such as the first signal interface 146. In an embodiment, the standardized core-signaling interface (also known as a "core socket") may be provided by the Open Core Protocol. Target IP cores also communicate to the shared interconnect 144 with intelligent network adapters 120–142 through these signal interfaces.

The translation intelligence 124 in the initiator network adapter may detect for the presence of the additional pieces of information in the read request. If detected, the initiator network adapter and the target network adapter communicate requests and responses to each other through special write-type request packets and response packets with annotations added to these special request packets and response packets. If the burst information is detected, the translation intelligence 124 in the initiator network adapter 120 converts the multiple read requests to a single write request with annotations in the data field of the write-type request packet to indicate how many read requests were combined, such as a burst length annotation, and the addresses associated with each read request, such as a burst address sequence annotation. Note, in an embodiment, control fields, such as a ReqInfo can be sub fields embedded within the data field of the write-type request packet. The ReqInfo field can be used as a location to communicate additional annotations.

The additional pieces of information detected for by the translation intelligence 124 in the initiator network adapter 120 may also be the target address of an incoming burst request. The initiator translation intelligence 124 may perform an address look up on the target address to determine if the target is capable of decoding the annotations. The initiator translation intelligence 124 converts the one or more read requests to the single write-type request packet with annotations based upon an address of the single target indicating that it is capable of decoding the annotations in the single request packet. The initiator network adapter 120 may bypass the translation intelligence 124 and the single request packet conversion process if the address of the target is not listed as capable of decoding the annotations of the single request packet.

In an embodiment, the address decoding logic in each initiator bridge module 124 labels certain regions as packet-capable targets (e.g. those targets serviced by a network adapter with translation intelligence). All transactions not addressed to these regions will be sequenced as direct transactions. A direct transaction occurs as a typical request or response transaction across the communication fabric and doesn't undergo the single request packet conversion process when communicated over the shared resource. The direct transactions essentially bypasses the translation intelligence causing a request to be forwarded directly to a standard initiator network adapter module, and a response to be forwarded directly back to the initiating IP core.

Thus, the detection logic in the translation intelligence 124 detects for additional information in a read request containing burst information that communicates one or more read requests in a burst from an initiator Intellectual Property (IP) core that are going to related addresses in a single target IP core. The detection logic may also perform an address lookup of the target address to determine whether the target is capable of decoding the annotations of the special single write-type request packet. If not capable, then the network adapter performs a standard direct transaction. The detection logic may communicate to conversion logic in the translation intelligence 124 that the burst information is detected.

The single request as well as the direct requests may be transmitted using the underlining protocol of the communication fabric. The transfer of the request is decoupled from the one or more responses by communicating the one or more responses to the initiator when the one or more responses become available without the initiator having to poll for the responses or block the communication fabric waiting for the responses. The request and the one or more responses form a fully decoupled Single Request multiple Data (SRMD) transaction. The implementation allows for simultaneous utilization of the decoupled SRMD protocol for access to high latency targets and the native polling protocol of the underlining fabric for access to low latency targets.

The initiator network adapter 120 gains access to the shared interconnect 144 by winning a round of arbitration. The initiator network adapter 120 transmits this single write-type request packet with additional annotations over the shared resource. The transmission logic in the initiator network adapter 120 transmits this single write-type request packet with annotations. The initiator network adapter 120 relinquishes control of the interconnect 144 to allow other network adapters 122–142 to issue their transactions after the single request packet with annotations is transmitted. The initiator network adapter 120 may also issue additional requests prior to receiving the solicited responses.

The second network adapter 122, a target network adapter, contains receiving logic to receive the single request packet with annotations and detection logic to detect the annotations. The second network adapter 122 also contains conversion logic to convert the single request packet with annotations into the original number of read requests, where each read request has its original target address. The translation intelligence 148 in the target network adapter decodes annotations of the single write-type request packet, such as burst length and burst address sequence, to perform the conversion. The translation intelligence 148 also stores both the initiator's address, such as an initiator's identification tag, and the number of read request in this burst series that were combined into this single write-type request packet.

The target network adapter 122 transmits the converted number of read requests across a second signal interface 150 to the target IP core. The target IP core, such as a Memory Scheduler 118, generates responses to the multiple read request. Each response carries data in bit words.

The initiator network adapter 120 does not need to check on the status of the target IP core's generation of responses to the multiple read request. The initiator network adapter does not need to poll. The target IP core 118 communicates the multiple responses to the read requests across the second ssignal interface 152 to the target network adapter connected to the shared interconnect 144 as the one or more responses become available without the initiator having to poll for the communicated responses. The translation intelligence 148 in the target network adapter 120 receives the two or more responses to the two or more number of read requests, each response carrying data in bit words. Note, "N" number may indicate a numerical number such as 2, 5, 8, etc.

The translation intelligence 148 in the target network adapter 122 converts each data response into a special write-type response packet with the address of the initiator in the address field of the write-type response packet. The target network adapter 122 generates the address in the address field of the write-type response packet by using the stored address of the original initiator's address, such as a con ID, identification tag, etc., in the translation intelligence 148. The translation intelligence 148 in the target network adapter 122 notes the number of response packets in this series sent back to the initiator network adapter 120. The target network adapter 122 annotates the last response packet in this series as the last/final packet in a control field such as the ReqInfo field.

The target network adapter 122 gains access to the communication fabric by winning a round of arbitration. The target network adapter 122 transmits the multiple write-type data response packets with annotations over the shared interconnect 144.

The translation intelligence 124 in the initiator network adapter 120 receives the write-type data response packets and detects for the presence of the annotations. If detected, the translation intelligence 124 in the initiator network adapter 120 converts each write-type data response packet into a standard data response to the read request.

Upon transmitting the last write-type data response packet in this series, the translation intelligence 148 in the target network adapter 122 clears its stored information regarding this request and response transaction. The target network adapter 122 relinquishes control of the communication fabric to allow other network adapters 120, and 126–142 to issue their transactions after each response packets is transmitted.

The translation intelligence 124 in the initiator network adapter 120 checks for the last/final packet annotation in the response packets. Upon converting the last write-type data responses in this series, the translation intelligence 124 in the initiator network adapter 120 clears its stored information regarding this transaction.

The initiator network adapter 120 communicates the multiple data responses to the initial read requests across the first signal interface 146 to the initiating IP core 102.

Thus, the shared interconnect 144 with intelligent network adapters 102–142 may use a set of extensions with the write-type request and response packets to facilitate accelerated burst performance for multimedia and computing initiator cores.

In an embodiment, the communication fabric with intelligent network adapters 102–142 implements the higher level protocol that has the ability to enhance the burst read capabilities for target cores with long and/or variable latencies. The communication fabric with intelligent network adapters 102–142 accomplishes this task by converting most read transactions from initiator IP cores from multiple transactions into a single write-type transaction. The write-type transaction carries the read request information from the initiator IP core to the target IP core. Also, one or more write transactions carry read response packets and data from the target IP core back to the initiator core. Thus, the communication fabric with intelligent network adapters 102–142 may convert a Read access into an implicit Write back to the source to improve efficiency of access to targets with long or variable latency such as Dynamic RAM-based memory subsystems.

The communication fabric with intelligent network adapters 102–142 may be a configurable, scalable system on a chip inter-block communication system. The interconnect 144 with intelligent network adapters 102–142 decouples IP cores from each other in the system. This enables IP cores to be independently designed and reused without redesign. The network adapters 102–142 are mated to an IP core to provide a decoupling of core functionality from inter-core communications.

The single request may also have annotations indicating the width of the data bus of the initiator, which corresponds to represent the unit size of the requests. The translation logic being configured to detect and decode a width of the data bus communicated in a request allows IP cores that vary in width to connect to same communication fabric with annotations that show the data bus width of the requesting device. For example, an on chip processor may have a port with data width of 64 bits wide. The on-chip processor may send a burst request for multiple responses to a memory that has a port with data width of 128 bits wide. The 128 bits wide memory may send half the number of requests from what the initiator thinks it needs at twice data bandwidth.

The translation logic knows data width of the target and detects the data bandwidth of the requesting device from the annotation in the request. The translation logic performs a data width conversion to communicate the unit size of the request. The unit size of a burst length from an initiator may be in bytes or words of predefined width.

The high-level hardware protocol converts the series of one or more requests from an initiator to a single read or write request carrying in-band information fully describing the burst and the response routing. The single request may carry in-band information fully describing the burst and the response routing. If the address sequence represented by the burst type is determined to be non-incrementing, additional attributes of the specific burst type may be annotated to the request.

Figure 2:
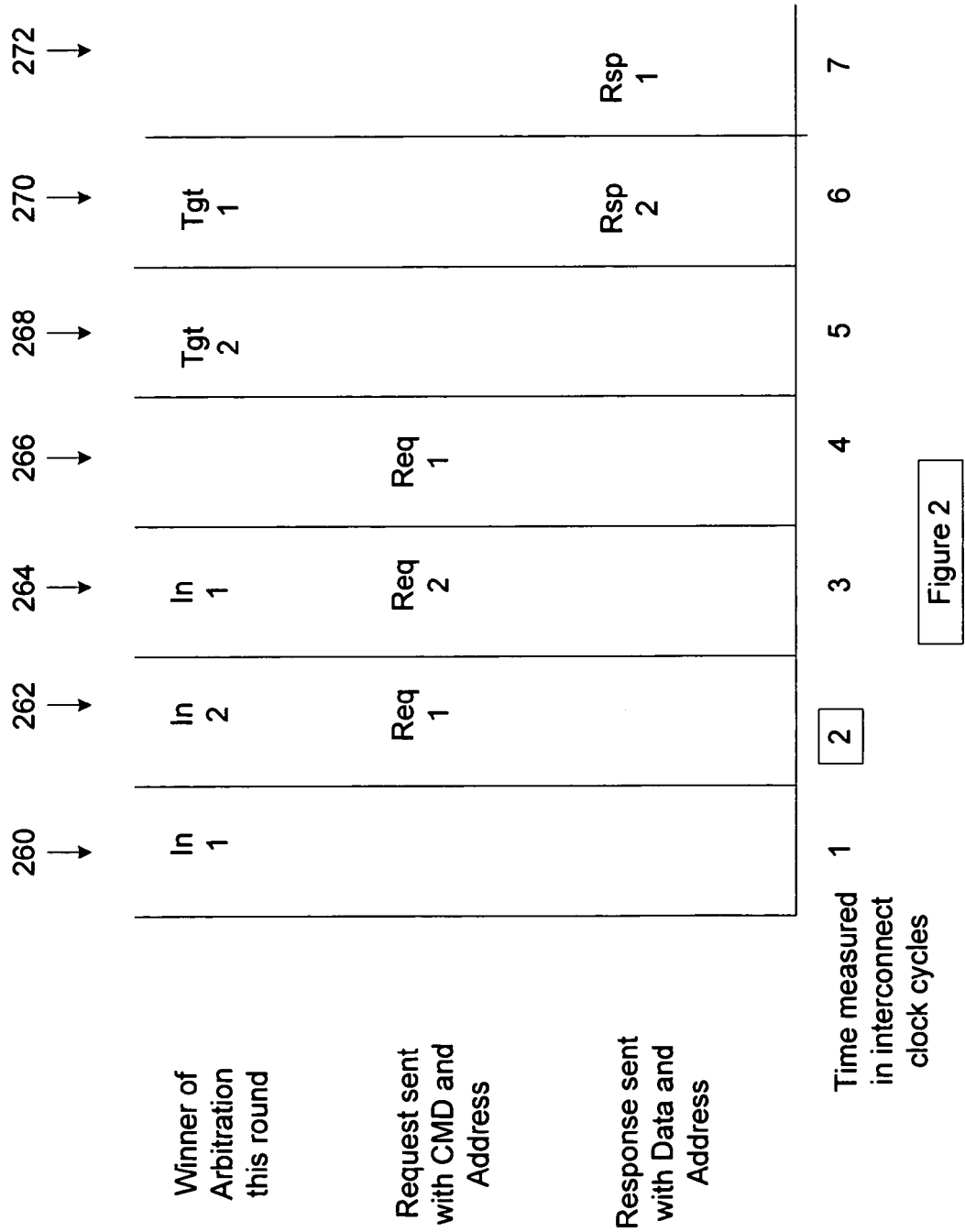
FIG. 2 illustrates an embodiment of an example pipelined arbitration process without blocking or polling for solicited responses.
Figure 3A:
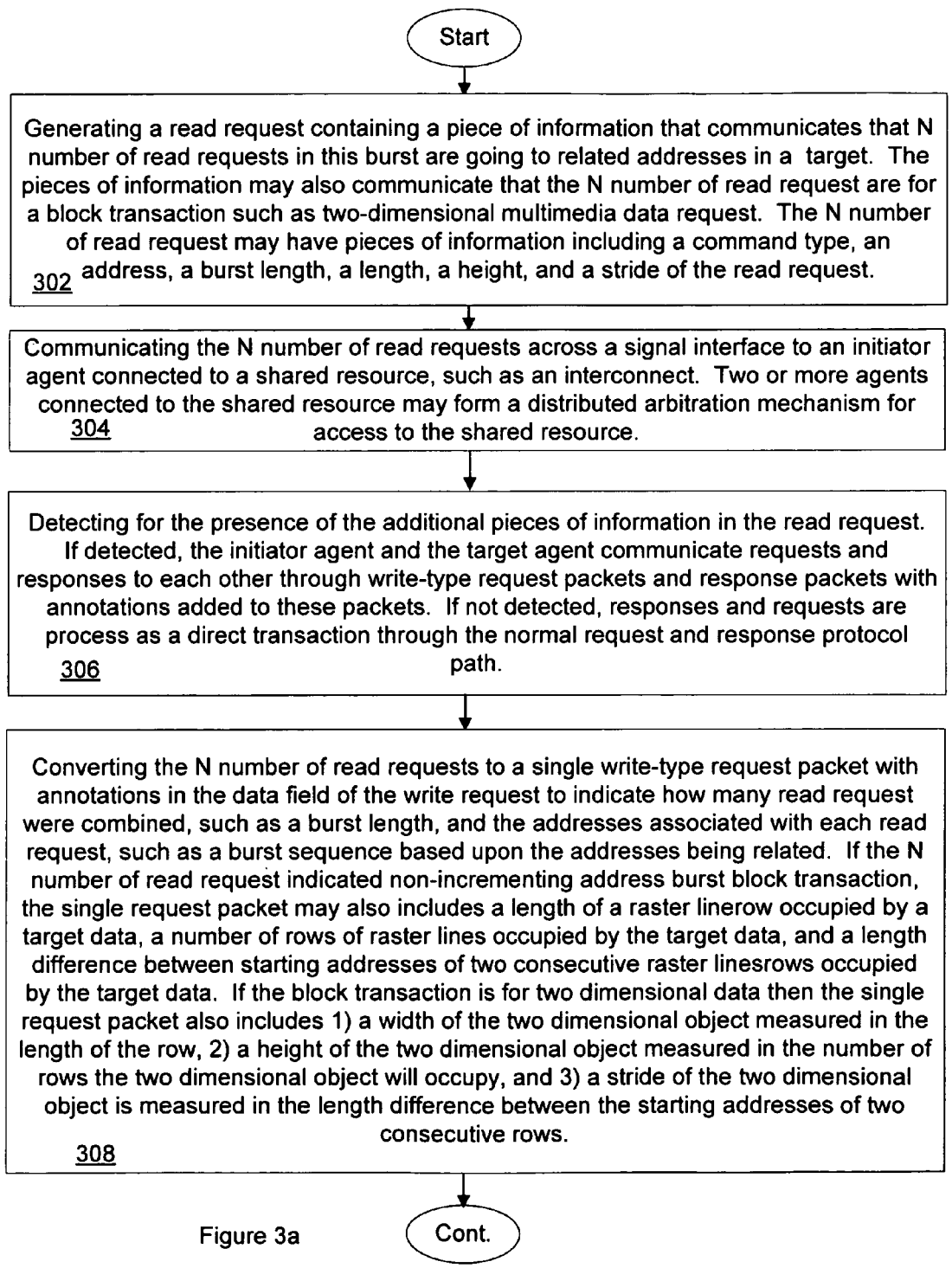
FIGS. 3a through 3d illustrate a flow diagram of an embodiment of a request packet and response packet transaction over a shared resource.
Figure 3B:
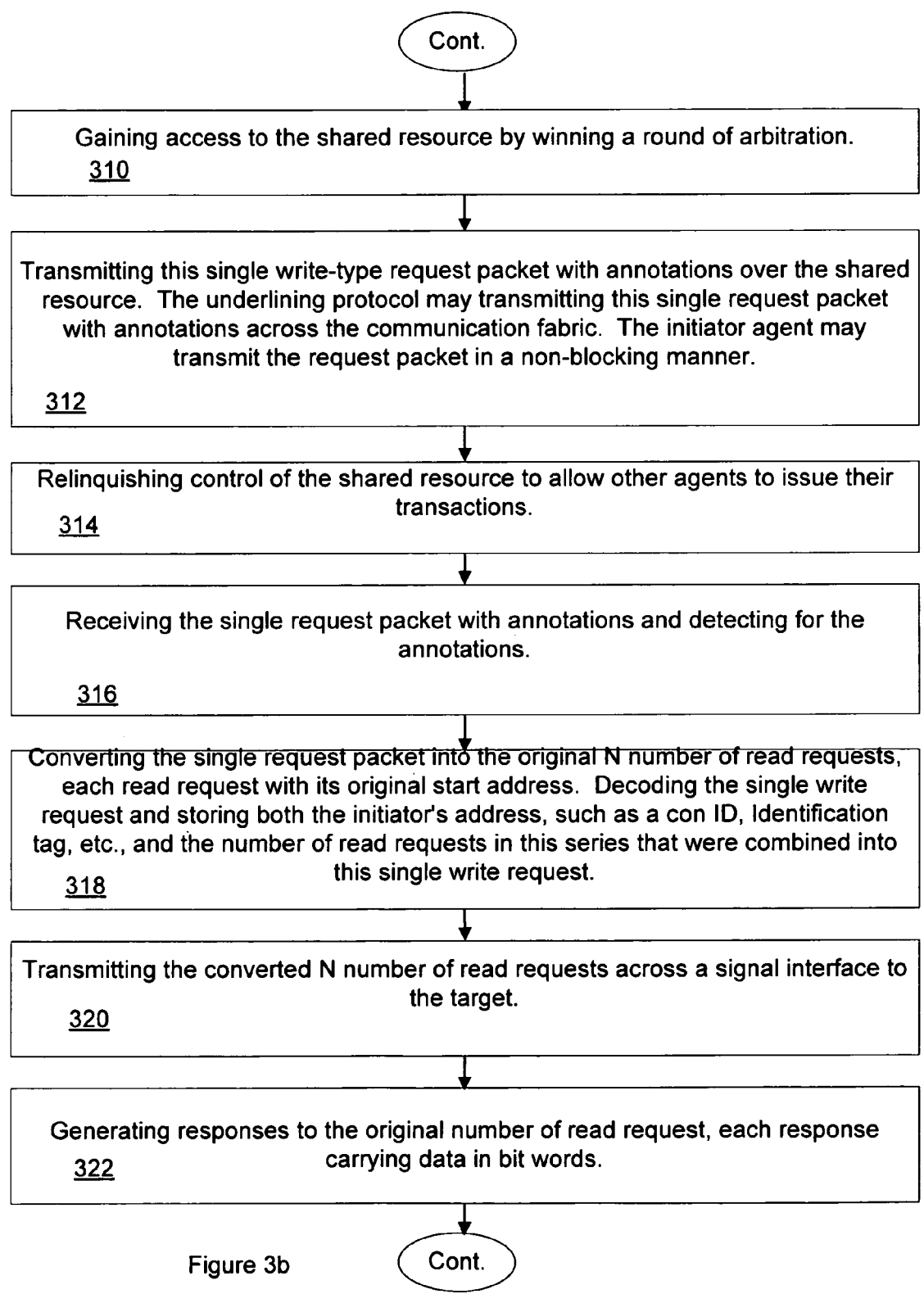
Figure 3C:
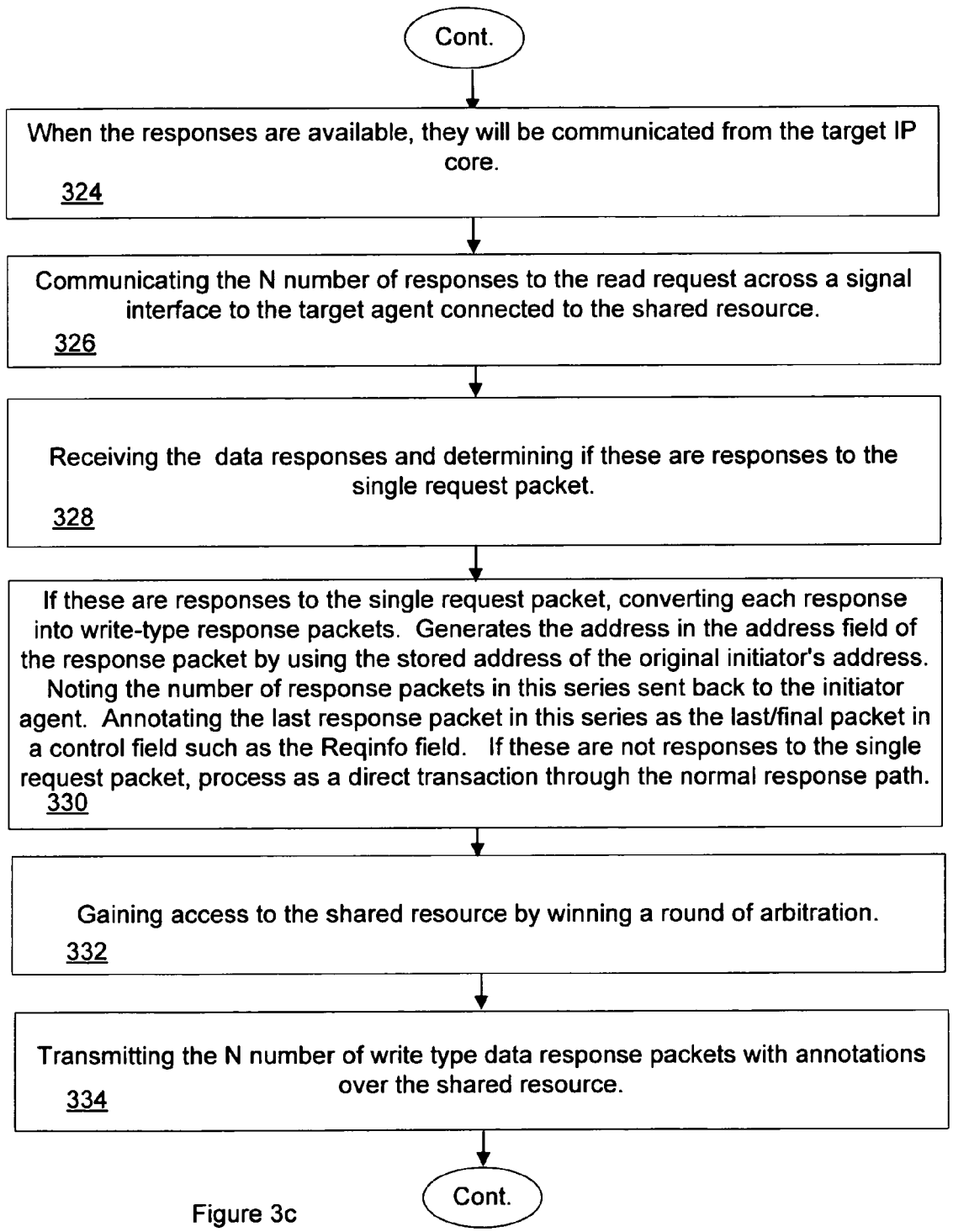
Figure 3D:
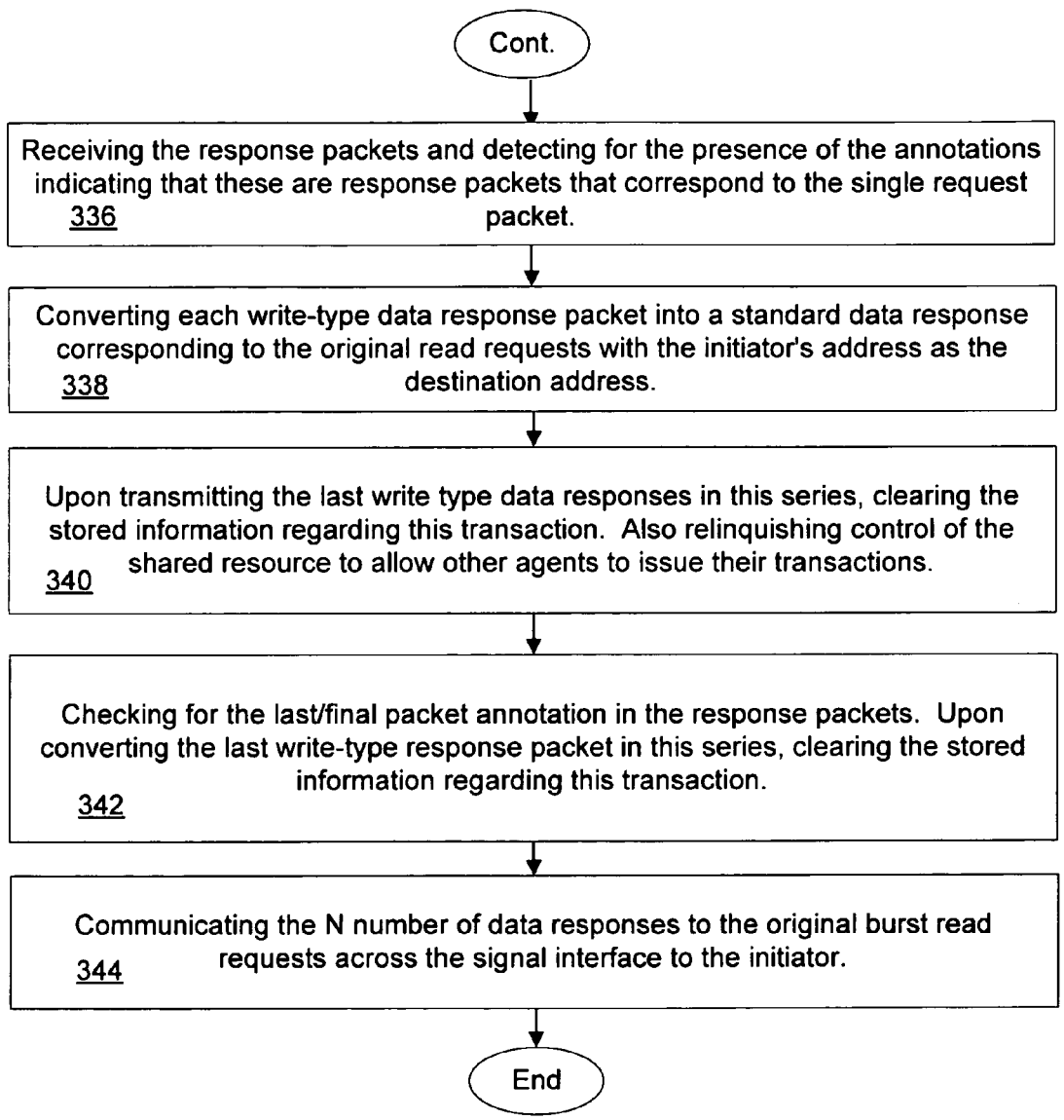

FIG. 2 illustrates an embodiment of an example pipelined arbitration process without blocking or polling for solicited responses. The interconnect with intelligent network adapters may be non-blocking. A first initiator network adapter may win access to the shared resource, such as the interconnect, on a first clock cycle of the communication fabric 260. The first initiator network adapter may send a request with command and address annotations across that communication fabric on a second clock cycle of the communication fabric 262. The second initiator network adapter may also win access to the communication fabric on the second clock cycle of the communication fabric 262. The second initiator network adapter may send a request with command and address annotations across that communication fabric on a third clock cycle of the communication fabric 264.

The first initiator network adapter may again win access to the communication fabric on a third clock cycle of the communication fabric 264. The first initiator network adapter may send another request with command and address annotations across that communication fabric 264 on a fourth clock cycle of the communication fabric 266.

On a fifth clock cycle 268, a response to the second request has been generated. The response has become available. The second target network adapter may win access to the shared resource. On a sixth clock cycle 270, a response to the second request may be transmitted across that shared resource. Also on a sixth clock cycle 270, a response to the first request has been generated and a first target network adapter may win access to the shared resource. On a seventh clock cycle 272, a response to the first request may be transmitted across that shared resource.

Thus, an initiating core may issue two or more requests prior to receiving a response to the first request because the request is processed in a non-blocking pipeline process. The first network adapter issued requests on the second clock cycle 262 and the fourth clock cycle 264. The second communication fabric clock cycle 262 started a delay period in communication fabric clock cycles to when the data responses to the read request would be generated. The target then arbitrates for use of the communication fabric when the responses are available. The initiator does not poll, i.e. generate status checks transmitted across the communication fabric, to check on the status of the availability of the response. Thus, the initiating core may issue two or more requests prior to receiving a response to the first request and does not need to block the communication fabric waiting for a transmission of the one or more responses.

As discussed, the interconnect with intelligent network adapters may be a non-blocking interconnect architecture using a higher level split-transaction protocol to communicate between subsystems on the chip. The arbitration process to deliver the data response is separated from the arbitration process to send the read request. A read transaction is initiated by transmitting the annotated read request to all other network adapters connected to the interconnect. The issuing network adapter then relinquishes control of the interconnect, allowing other network adapters to issue their transactions. When the data is available, the target network adapter supplying the data, typically memory, arbitrates for the interconnect, and then transmits the data along with the initiators address and transaction ID so that the original issuer can match the data with the particular request. The interconnect is non-blocking because the issuing network adapter relinquishes control of the interconnect to allow other network adapters to issue their transactions. The non-blocking transaction protocol enables multiple individual initiator-target transactions to occur concurrently across the interconnect structure. The protocol allows each network adapter to have up to multiple transactions in progress at one time.

Referring to FIG. 1, in an embodiment, all of the request packet transfers over the interconnect 144 with intelligent network adapters 102–142 can be memory-mapped. Unique address spaces may be assigned to all target network adapters. Up to four non-overlapping address spaces can be assigned to each target network adapter. A System Address Map configured by a user in the Address Map pane of Intellectual Property generator tool can be implemented as a distributed collection of address match registers located inside the corresponding target network adapters. Each address match register corresponds to a target address space. This helps initiating network adapters determine whether a transaction addresses a target region defined in the target network adapter and is capable of receiving and processing request packet transactions.

In an embodiment, the internal packet format between network adapters may be as follows. Each request packet has a packet header. This header contains information carried as in-band request qualifiers. Each response packet has its header carried as in-band request qualifiers; all data fields associated with response packets contain the actually requested read data for the overall transaction, except in the case of errors.

All packet headers in the protocol may be constructed having defined fields in the header part of the packet. The packet header may contain various field entries such as Command type, (i.e. read transaction, write transaction or WriteNonPost transaction), Burst incrementing code, Address sequence, and a ReqInfo sub-control field for additional annotations. Further, block transactions can be supported and may be treated as a series of incrementing bursts.

When an initiating network adapter decodes a Write, WriteNonPost, or Read transaction with a valid incrementing burst code that addresses a target network adapter, the initiating network adapter generates the write-type request packet transaction. All request packet transactions can be issued as incrementing posted-write bursts. The incrementing burst packet header has its ReqInfo sub-fields encoded BurstLength and the initiating network adapter's address information.

The protocol works together with the intelligent network adapter to define explicit uses of the ReqInfo field to support enhanced transaction options. In addition to the capabilities of the legacy initiator network adapter, the initiator bridge module with translation intelligence 124 accelerates precise incrementing bursts of types RD, WR, and WNP with an arbitrary length between 1 and 63 OCP words, as well as block burst (2-D) transactions, which are characterized by length (width), size (height), and stride. The initiator bridge module with translation intelligence 124 also supports up to 8 bits of user-defined ReqInfo request information.

Request and response packets may have some differences in their formats.

The packet may have a CMD field, a burst field, an Address filed, a control field, and a data field. The request packet format assists to achieve burst acceleration and payload throughput in the interconnect 144 with intelligent network adapters 102–142 by implementation of a Single-Request/Multiple-Data (SRMD) internal transfer protocol. Request packets may be formed using a simple (posted) Write burst of one or more transfers. The address field of the first transfer in the packet specifies initiator word-aligned starting address for the transaction specified by the request packet. The lowest address bits may be determined from the ByteEn field. The packet header carries the first address and ReqInfo field. For read packets, the initiating network adapter issues a single transfer carrying the packet header. This transfer uses a LAST annotation as its burst code. For write request packets, the translation intelligence 124 propagates burst codes along with the addresses received from the initiator IP core to the target network adapter. The target network adapter may ignore these later addresses, and simply use a local address sequencer to generate the appropriate target protocol addresses.

The initiator bridge module with translation intelligence 124 annotates most of the request packet header via its ReqInfo output to the initiating network adapter. The user ReqInfo field may be located after the header fields and/or in the data field. The width of the ReqInfo field can be user-programmable.

If a new transaction request of an initiating network adapter is addressing a target network adapter, it can be remapped to a pseudo-SRMD transaction with the request format described above.

The response packet format may differ from the request packet. The Response Packet Format may have a CMD field, an address field, a burst field that also indicates the Last response in this series, a control Reqinfo field, and a data field. The response packet format uses a few bits of the ReqInfo field to transmit its header. The MData field may be annotated as a "don't care" on all non-posted write responses as well as on read error responses, and should be set to 0. For successful reads, the MData field carries the read data. The address field can be composed of a fixed field which identifies the response packet address region where initiating the network adapter is located in the address space, a response target ID, such as an initiating network adapter SBConnID, and a number of reserved bits. The ReqInfo field can also be used to transfer the value of number of responses returned from the target, and a bit indicating whether the current transfer is the LAST in a sequence of response packets to the burst read request packet. Request packets may use two low-order bits of the ReqInfo field to distinguish between direct transactions (identified as all 0's) and response packet (identified as not all 0's) transfers.

For direct transactions (except where the address matches a packet response region), the operation can be essentially a bypass of the bridge logic, i.e., the request is forwarded directly to standard initiator network adapter module, and the response is forwarded directly back to the initiating OCP. For packet transactions, the initiator bridge module with translation intelligence 124 uses the result of the address decode, together with the other request fields, to construct the packet header, and to issue a request packet. The typical network adapter logic can be used to provide any required responses for posted writes, and to all but the last response to non-posted write packets. The initiator bridge module with translation intelligence 124 then waits for the response packets, if the associated request expects an explicit response. When a response packet arrives, the initiator bridge module with translation intelligence 124 extracts response information from the ReqInfo fields of the packet, and provides the response to the initiating core together with any requested read data.

The target network adapter can receive both direct and packet requests. A request packet may be indicated by annotations in the command field in the ReqInfo header arriving with the request packet. The target bridge module with translation intelligence 148 interprets this packet header, and then issues the appropriate protocol request via the target core interface. Each target bridge module with translation intelligence 148 is capable of propagating/generating all types of legal bursts, regardless of the capabilities of the attached target, to ensure maximum interoperability. The target bridge module with translation intelligence 148 passes responses to direct requests through to the normal response path and generates response packets in response to a request packet. The header for such responses indicates the response code, and whether the response is last in a burst. The target bridge module with translation intelligence 148 routes the response packet back to the initiator bridge module with translation intelligence 124 wrapped around the requesting initiator network adapter 120.

The target bridge module with translation intelligence 148 tracks the response pipeline, discarding any posted write responses, and all but the last non-posted write responses. The target bridge module with translation intelligence 148 generates response packets for the read responses and the last non-posted write response. The header for such responses indicates the response code, and whether the response is last in a burst. The target bridge module with translation intelligence 148 creates the response address by concatenating some user-defined upper address bits (that map the transfer into reserved spaces in the direct address map) together with the SBConnID of the request. This routes the response packet back to the initiating network adapter. Any read data associated with the response is transported as write data via the Mdata field.

The translation intelligence 124 may have additional logic to detect for a series of incrementing burst transactions indicated as a block transaction. The request generated for the block transaction includes annotations indicating that multiple read requests in this burst are coming from this same initiator and are going to related addresses in a single target. The annotations also include 1) a length of the row, occupied by a target data, 2) a number of rows occupied by the target data, and 3) an address spacing between two consecutive rows occupied by the target data.

Figures 4A, 4B:
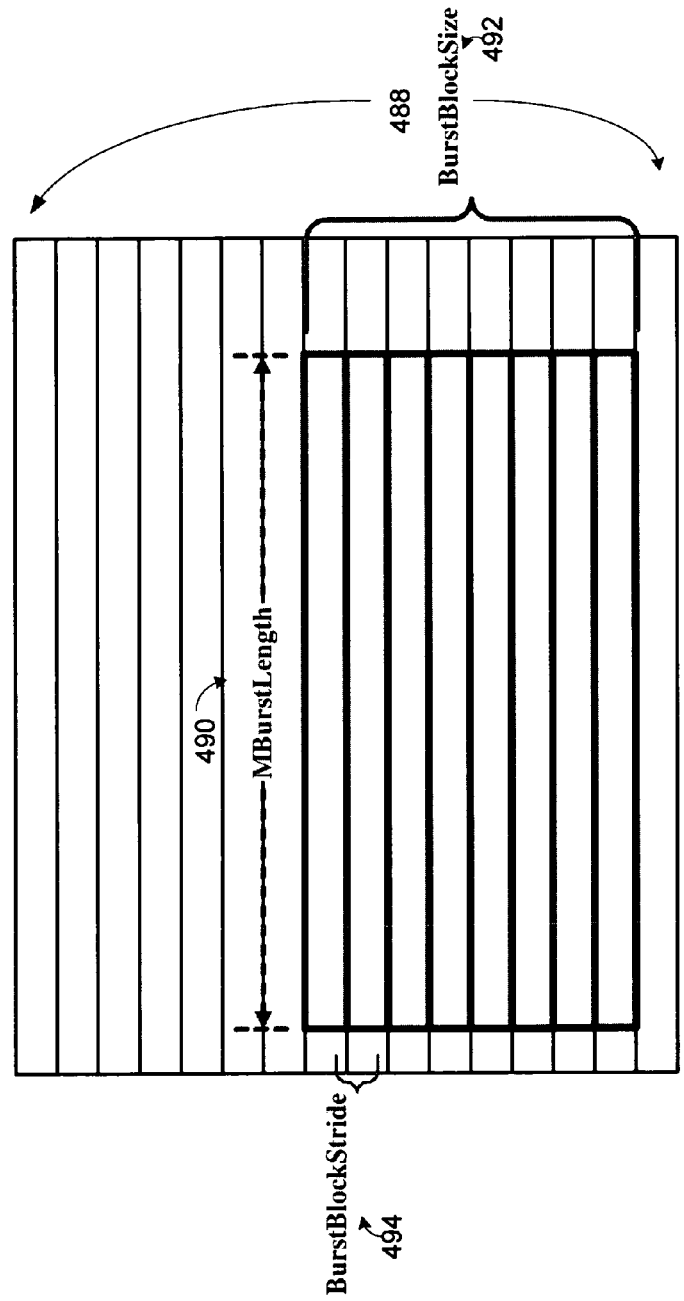
FIG. 4a illustrates an example block transaction request packet for a two-dimensional data object.
FIG. 4b illustrates an example frame buffer to store multimedia data for display on a display device.

FIG. 4a illustrates an example block transaction request packet for a two-dimensional data object. The block transaction request packet 472 may have many sub fields in the header portion of the packet. The block transaction request packet may contain a command field 474, an address field 476, a block burst indicating field 478, a burst sequence field 480, a burst block length field 482, a burst block size field 484, a burst block stride field 486, as well as other similar fields. The Reqinfo field may contain the burst block field 478 through burst length field 482. The burst block size field 484 and burst block size 486 may be located in the data field/payload area. The two-dimensional data may be multimedia data, imaging data, or similar data.

FIG. 4b illustrates an example frame buffer to store multimedia data for display on a display device. The rows of memory cells 488 of the frame buffer may correspond to the width of the raster lines for that display device. The two-dimensional multimedia data object may occupy neighboring rows of the frame buffer corresponding to raster lines on the display device. A single request packet may be generated and communicated over the communication fabric for the block transaction for the two-dimensional data object.

Referring to FIGS. 4a and 4b, the block transaction may be a request for two-dimensional data. The width 490 of the two-dimensional object can be measured in the length of the raster line. The burst block length field 482 may contain the width 490 of the two-dimensional object. The height 492 of the two-dimensional object can be measured in the number of rows of raster lines the two-dimensional object will occupy. The burst block size field 484 may contain the number of rows of raster lines 492 that the two-dimensional object will occupy. The stride 494 of the two-dimensional object can be measured in the length difference between the starting addresses of two consecutive raster lines. The burst block stride field 486 may contain the stride 494 of the two-dimensional object.

The translation intelligence has logic to convert, if a block transaction annotation is detected, the block transaction to the single read or write request packet with annotations in a Reqinfo field of the request to indicate 1) how many read requests were combined, 2) the addresses associated with each read request, 3) the length of the raster line occupied by a target data, 4) the number of rows of raster lines occupied by the target data, and 5) the length difference between the starting addresses of two consecutive raster lines occupied by the target data.

In an embodiment, the fields of the Request Packet Header may have parameters such as a Burst Length 482 with a range of Range: 1–63, BurstBlock Size 484 of the block burst indicating the number of rows, BurstBlock Stride 486 indicating the start-to-start spacing of block bursts, and the Initiator information.

Thus, the translation intelligence in the initiator network adapter converts the N number of read requests in the incrementing burst transaction to a single write-type request packet with annotations in a control field of the request packet to indicate how many read requests were combined, such as a burst block, the addresses associated with each read request, such as a burst sequence, the length of a raster line the 2D object occupies, the number of raster lines the 2D object will occupy, such as a raster height dimension, and the length difference between raster lines, such as a stride.

In an embodiment, the two-dimensional block transaction can be defined as an aggregate transaction of BurstBlockSize incrementing Read or Write burst transactions of equal length (MBurstLength), with a constant stride (BurstBlockStride) between the starting addresses of consecutive member burst transactions. BurstBlockSize represents the number of member burst transactions (rows). BurstBlockStride is measured in ip.data_wdth words.

Referring to FIG. 1, in an embodiment, the interconnect 144 with intelligent network adapters 102–142 manages to more effectively move the high frame rate video, 3D graphics, and 2D still image data streams found in multimedia applications. The performance of multimedia SOCs can depend on efficiently streaming large amounts of variable data through the device and to and from its single external DRAM memory. The interconnect 144 with intelligent network adapters 102–142 may concurrently handle multiple asymmetrical and variable length data flows at the maximum throughput of the memory channel with an aggregate bandwidth of, for example, up to 4 Gigabyte/second. Configurable levels of QoS (quality of service) enable tailoring of data channel characteristics to meet application-specific performance requirements.

The 2D block transaction feature accelerates memory access to fundamental data structures used in video and graphics applications. As a result of these new features the interconnect 144 with intelligent network adapters 102–142 may deliver a sustained level, for example, of 90 percent interconnect utilization in the extremely demanding traffic conditions created by multiple image-based data flows between the multimedia SOC and its memory subsystem. Media and consumer-video SOC chips, for example, have to move multiple streams of data from place to place at high speed. The interconnect 144 with intelligent network adapters 102–142 may be well suited to maintain all that bandwidth, with MPEG video going here, DSP streams going there, and so on.

Consumer Digital Multimedia Convergence (CDMC) applications have a large reliance upon the ability to efficiently move two-dimensional graphics, image, and/or video data between processing engines and memory (principally some form of DRAM). The protocol has defined user extension capabilities that can be used to capture 2D-related transaction information in the optional control field known as ReqInfo. The interconnect 144 with intelligent network adapters 102–142 will have an option to be configured to support a defined use of these extension fields to explicitly capture 2D transactions, and will thereby support efficient bridging between 2D-capable initiators and non-2D targets.

As discussed, a block transaction may be simply a chained set of incrementing bursts. The BurstBlockSize (Y-count) parameter determines the number of such bursts (rows) in the set. The BurstBlockStride parameter specifies the distance (spacing) between the starting addresses of two consecutive rows in the physical memory. The main implications of block transaction's are related to the fact that this operation requires a set of "holding" registers saving the member burst (row) length (X-count), the starting address of the previous row, and another counter (Y-counter) that counts the number of rows. At the beginning of a block transaction the X-count Holding Register is loaded with the RBurstLength value, and the Address Holding Register is loaded with the value of RAddr. Upon arrival of the Data phase of the Packet Header transfer the RBurstBlockSize (Y-count) and the RBurstBlockStride registers are initialized. When the X-counter reaches one, it is reloaded with it's original value from it's holding register, while the starting address of the next burst is loaded with the sum of the previous starting address held in it's holding register and the RBurstBlockStride register. A block transaction is considered completed when both the X and the Y counters are done.

At the IP OCP, a block transaction can be composed of BurstBlockSize legal OCP 2.4 bursts. This implies that the Burst field has to contain valid incrementing OCP burst codes with a LAST in the Burst field of the last transfer of every member transaction (row). It is then legal for the initiator to issue both read and write block transactions.

FIGS. 3a through 3d illustrate a flow diagram of an embodiment of a request packet and response packet transaction over a shared resource.

In block 302, the initiator Intellectual Property (IP) core generates a read request containing a piece of information that communicates that N number read requests in this burst that are coming from this same initiator and are going to related addresses in a single target IP core. The pieces of information may also communicate that the multiple read requests are for a block transaction such as two-dimensional multimedia data request. The Initiator IP core may also generate the multiple read request with several more pieces of information including a command type, an address, a burst length, a length, a height of the read request, and a stride of the read request.

In block 304, the initiator IP core communicates the multiple read requests across a signal interface to an initiator network adapter connected to a shared resource, such as an interconnect. Two or more network adapters connected to the communication fabric may form a distributed arbitration mechanism for access to the shared resource.

In block 306, the translation intelligence in the initiator network adapter detects for the presence of the additional pieces of information in the read request. If detected, the initiator network adapter and the target network adapter communicate requests and responses to each other through special write type request packets and response packets with annotations added to these packets. If not detected, responses and requests are processed as a direct transaction through the normal request and response protocol path. Also, if the address of the target is not indicated as capable of decoding a single request packet, then processing the responses and requests as a direct transaction through the normal request and response protocol path. The translation intelligence/logic may implement a higher level protocol layered on top of an underlining protocol and the communication fabric.

In block 308, the translation intelligence in the initiator network adapter converts the multiple read requests to a single write-type request packet with annotations in the data field of the write request to indicate how many read requests were combined, such as a burst length, and the addresses associated with each read request, such as a burst address sequence. If the multiple read request indicated a non-incrementing address burst block transaction, the single request packet may also include a length of a row occupied by a target data, a number of rows occupied by the target data, and a length difference between starting addresses of two consecutive rows occupied by the target data. If the block transaction is for two-dimensional data then the single request packet also includes 1) a width of the two-dimensional object measured in the length of the row, 2) a height of the two-dimensional object measured in the number of rows the two-dimensional object will occupy, and 3) a stride of the two-dimensional object is measured in the length difference between the starting addresses of two consecutive rows.

In block 310, the initiator network adapter gains access to the communication fabric by winning a round of arbitration.

In block 312, the initiator network adapter transmits this single write-type request packet with annotations over the communication fabric. The underlining protocol of the initiator network adapter transmits this single request packet with annotations. The initiator network adapter may transmit the request packet in a non-blocking manner and issue additional requests prior to receiving the responses to the initial request.

In block 314, the initiator network adapter relinquishes control of the communication fabric to allow other network adapters to issue their transactions.

In block 316, the translation intelligence in the target network adapter receives the single request packet with annotations and detects for the annotations.

In block 318, the translation intelligence in the target network adapter converts the single request packet into the original multiple read requests, each read request with its original start address. The translation intelligence in the target network adapter decodes the single write request and stores both the initiator's address, such as a con ID, and the number of read requests in this series that were combined into this single write request.

In block 320, the target network adapter transmits the converted multiple read requests across a signal interface to the target IP core.

In block 322, the target IP core generates responses to the original number of read requests, each response carrying data in bit words.

In block 324, the initiator network adapter does not need to check on the status of the target IP core generation of responses to the number of read requests. When the responses are available, they will be communicated from the target IP core.

In block 326, the target IP core communicates the multiple responses to the read request across a signal interface to the target network adapter connected to the shared resource.

In block 328, the translation intelligence in the target network adapter receives the data responses and determines if these are responses to the single request packet.

In block 330, if these are responses to the single request packet, the translation intelligence in the target network adapter converts each response to the read request into the special write type response packets. The target network adapter generates the address in the address field of the response packet by using the stored address of the original initiator's address, such as a con ID, in the translation intelligence. The translation intelligence in the target network adapter notes the number of response packets in this series sent back to the initiator network adapter. The target network adapter annotates the last response packet in this series as the last/final packet in a control field such as the Reqinfo field. If these are not responses associated with the single request packet, then process the response as a direct transaction through the normal response path.

In block 332, the target network adapter gains access to the communication fabric by winning a round of arbitration.

In block 334, the target network adapter transmits the multiple write type data response packets with annotations over the shared resource.

In block 336, the translation intelligence in the initiator network adapter receives the response packets and detects for the presence of the annotations indicating that these are response packets that correspond to the single request packet.

In block 338, the translation intelligence in the initiator network adapter converts each write-type data response packet into a standard data response corresponding to the original read requests with the initiator's address as the destination address.

In block 340, upon transmitting the last write type data responses in this series, the translation intelligence in the target network adapter clears its stored information regarding this transaction. The target network adapter also relinquishes control of the communication fabric to allow other network adapters to issue their transactions.

In block 342, the translation intelligence in the initiator network adapter checks for the last/final packet annotation in the response packets. Upon converting the last write-type response packet in this series, the translation intelligence in the initiator network adapter clears its stored information regarding this transaction.

In block 344, the initiator network adapter communicates the multiple data responses to the original burst read requests across the signal interface to the initiating IP core.

Figure 5:
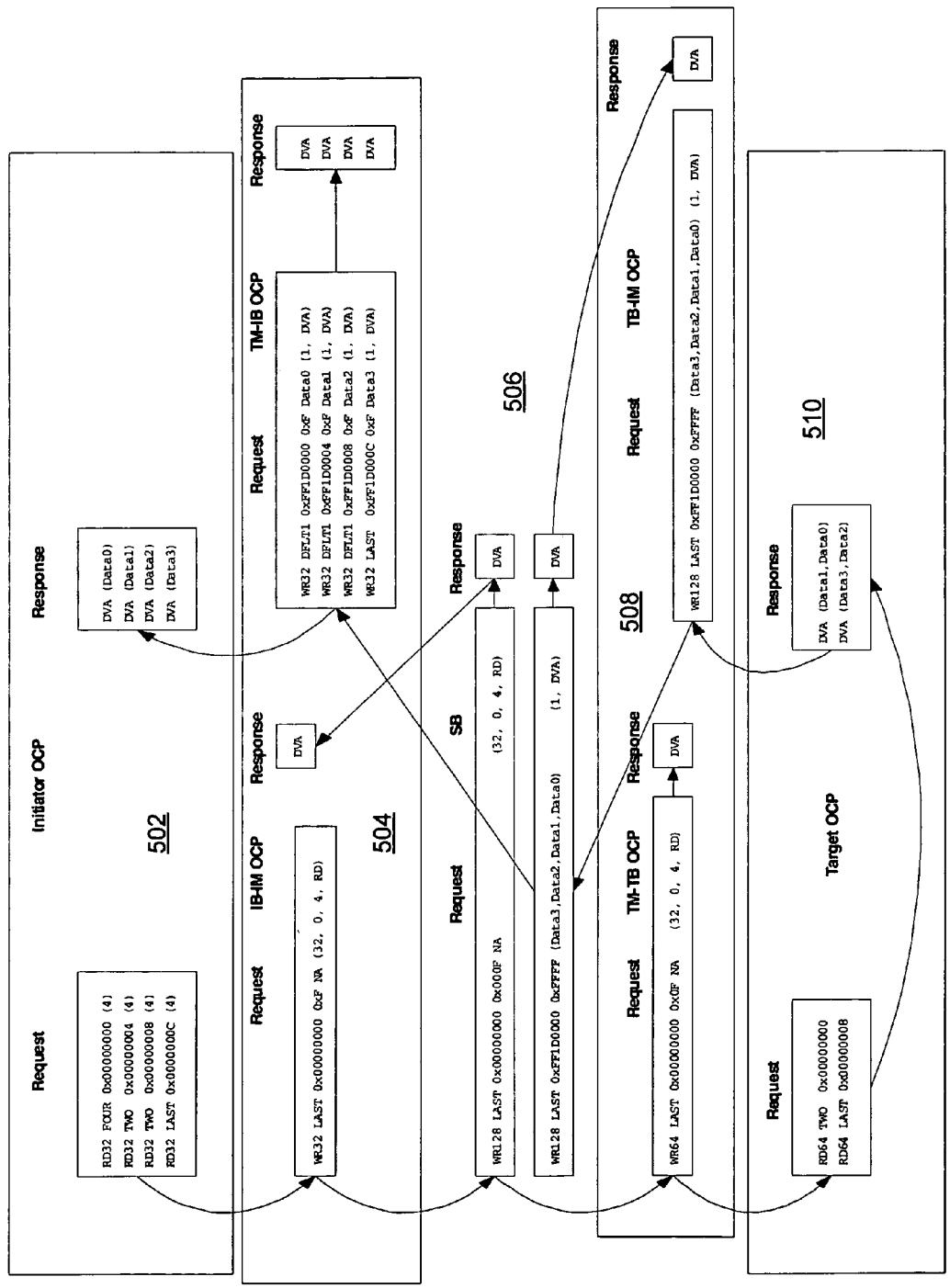
FIG. 5 illustrates an example conversion of multiple read requests into a single request packet and the associated responses.

FIG. 5 illustrates an example conversion of multiple read requests into a single request packet and the associated responses.

In block 502, the initiator sends multiple read requests indicating that this is a burst transaction. In block 504, the first instance of the translation logic converts the multiple request to a single write request with annotations in a control field and a data field of the write request to indicate how many read requests were combined into the write request and an address sequence associated with a burst transaction. In block 506, the underlining protocol transmits the single write request over the communication fabric. In block 508, the second instance of translation logic converts the single write request into an original number of read requests, where each read request has its original target address. The second instance of translation logic also performs a data width conversion of the number of original requests from the initiator to match the data width capability of the target.

In block 510, the target generates the responses. The target communicates the number of responses to the second instance of translation logic as the number of responses become available. In block 508, the second instance of translation logic makes some annotations to the write responses and transmits them over the communication fabric. In block 504, the first instance of translation logic converts the write responses into data responses and communicates the multiple responses to the initiator.

Figure 6:
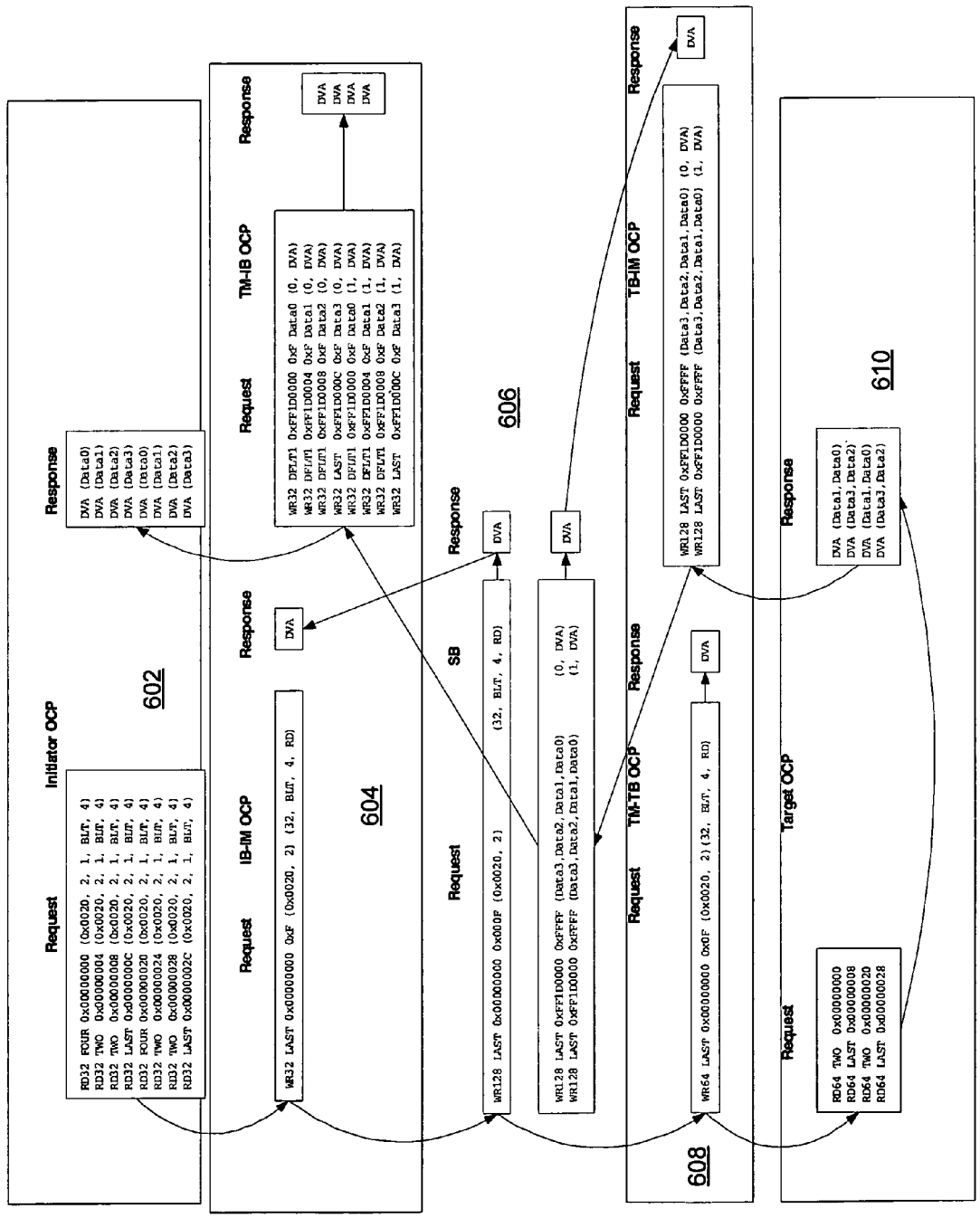
FIG. 6 illustrates an example conversion of a burst transaction for two-dimensional data converted into a single request packet and the associated responses.

FIG. 6 illustrates an example conversion of a burst transaction for two-dimensional data converted into a single request packet and the associated responses. FIG. 6 operates similar to the process described in FIG. 5. The read request in FIG. 6 contain additional information such as a number of rows occupied by the target data, and a length difference between starting addresses of two consecutive rows occupied by the target data.

In an embodiment, an example communication fabric with translation intelligence may be implemented in the following environment. In the Consumer Digital Multimedia Convergence market a number of portable digital multimedia devices are appearing in the consumer market that have technical requirements that in most ways mirror those for the wireless market. Some others (digital video camcorders, portable DVD players, etc. . . ) have technical requirements that are still closer to the main-stream multimedia devices, yet with much higher emphasis on power and size. Some other sub-markets in CONSUMER DIGITAL MULTIMEDIA include High-Definition digital set top boxes, which increasingly are morphing into generalized Residential Gateways and Home Servers, as well as High-Definition digital television devices, which, in turn, increasingly raise their feature and performance requirements closer to the ones normally associated with the DSTB.

Real time processing of video frames may consume most of the processing capability in a SOC. Video frames are generally too large to be kept memory resident inside an SOC. Thus they are stored externally in the densest form of memory. The processing of video frames requires multiple steps, several of which are most often performed by dedicated hardware processing units. As a result, the multimedia SOC architecture can be controlled by the need to transport massive amounts of data in either small or large chunks (depending on a particular implementation) between multiple internal processing elements and external DRAM, and by the need to keep those processing elements busy working in parallel most of the time.

This application requirement affects communication fabrics in several ways. First, bandwidth guarantees become valuable. Second, effective interface and sharing of external memory is valuable. The external memory may dictate the clock and data rates that must be supported. The communication fabric should be efficient at handling the external memory's asymmetric latency characteristics. The protocol implemented by the communication fabric can aid in efficient management of the external memory. Some data block sizes are larger than for computing applications, while some implementation of MPEG-2 decoders and encoders require efficient support of extremely small data blocks. The increasing utilization of Media Processors for Graphics, Audio, and other multimedia applications result in some degree of morphing between multimedia and computing requirements with a detrimental affect on the more traditional multimedia traffic patterns. As SOC designs evolve into Residential Gateway and Home Server functions they take on even more of the attributes of compute type applications.

The communication fabric should have techniques for exploitation of long bursts and 2D characteristics of some multimedia flows. Some multimedia applications may have 10 to 20 initiators, and very few targets (often one or two DRAM subsystems and a peripheral interconnect). It may be assumed that one of the targets is the head of a low performance peripheral interconnect (Synapse 3220) for access to control ports on the initiators and low-bandwidth peripheral devices. All but one or two of the initiators could be bandwidth sensitive. Often these initiators may have multiple concurrent internal activities, so multi-threaded (4 to 8) interfaces can be more common in this space than in most others.

The ultimate sources and destinations of the audio and video data may be external interfaces. Very often these interfaces have clock rates that are dictated by interface standards. The set of them that must be supported typically has a lot of asynchronicity. This application requirement directly impacts the interconnect requirements by putting a premium on effective clock decoupling.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

For example, the information representing the apparatuses and/or methods may be contained in an Instance, soft instructions in an IP generator, or similar machine-readable medium storing this information. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; DVD's, electrical, optical, acoustical or other form of propagated signals (e.g., carrier waves, infrared signals, digital signals, Electrically Programmable ROMs, Electrically Erasable PROMs, FLASH memory, magnetic or optical cards, or any type of media suitable for storing electronic instructions. The information representing the apparatuses and/or methods stored on the machine-readable medium may be used in the process of creating the apparatuses and/or methods described herein.

The IP generator may be used for making highly configurable, scalable system on a chip inter-block communication system that integrally manages data, control, debug and test flows, as well as other applications. In an embodiment, an example intellectual property generator may comprise the following: a graphic user interface; a common set of processing elements; and a library of files containing design elements such as circuits, control logic, and cell arrays that define the intellectual property generator.

The instructions and operations also may be practiced in distributed computing environments where the machine-readable media is stored on and/or executed by more than one computer system. In addition, the information transferred between computer systems may either be pulled or pushed across the communication media connecting the computer systems.

While some specific embodiments of the invention have been shown, the invention is not to be limited to these embodiments. For example, the higher layer protocol may communicate a single write request or a single read request over the communication fabric to solicit either multiple data responses or multiple data writes from a target. The invention is to be understood as not limited by the specific embodiments described herein, but only by scope of the appended claims.

What is claimed is:

1. An apparatus, comprising:
 a communication fabric in a system on a chip (SOC) to facilitate communications between functional blocks in the SOC; and
 a first functional block to communicate a single request fully describing attributes of a two-dimensional data block across the communication fabric to a second functional block capable of decoding the single request to obtain the attributes of the two-dimensional data block, wherein the second functional block to transmit data associated with the single request back across the communication fabric.

2. The apparatus of claim 1, wherein the single two-dimensional block request contains annotations indicating a length of a row occupied by a target data, a number of rows occupied by the target data, and address spacing between two consecutive rows occupied by the target data.

3. A computer readable medium containing instructions stored thereon, which, when executed by a machine, cause the machine to generate a representation of the apparatus of claim 1.

4. A system, comprising:
 a communication fabric in a system on a chip (SOC);
 two or more instances of translation logic coupled to the communication fabric;
 a first instance of translation logic block to convert a series of requests for communicating a two-dimensional data object into a single request that carries how many requests are combined into the single request and an address sequence associated with the requests; and
 a second instance of translation logic block to receive the single request communicated over the communication fabric, wherein the second instance of translation logic block to decode information carried by the single request to generate multiple requests corresponding to the number of requests originally in the block transaction request for the two-dimensional data object.

5. The system of claim 4, wherein the two or more instances of translation logic implement a higher level protocol layered on top of an underlining protocol to combine the series of requests into the single request and the translation logic utilizing an underlining protocol transmits the single request across the communication fabric.

6. The system of claim 4, wherein a network adapter relinquishes control of the communication fabric to allow other network adapters coupled to the communication fabric to issue their transactions after the single request is transmitted over the communication fabric to prevent blocking the communication fabric to wait for one or more responses to the single request.

7. A computer readable medium containing instructions stored thereon, which, when executed by a machine, cause the machine to generate a representation of the apparatus of claim 4.

8. The system of claim 4, wherein the single request is a write request packet with annotations in the write request to communicate how many requests are combined into the single request and an address sequence associated with the requests.

9. An apparatus, comprising:
a communication fabric in a system on a chip (SOC) to facilitate communications between functional blocks in the SOC; and
translation logic to convert one or more read requests from a first functional block to a single request that carries how many read requests were combined and an address sequence associated with a non-incrementing address burst transaction, wherein the single request is communicated across the communication fabric.

10. The apparatus of claim 9, wherein the single request also carries a width of a data bus of an initiator functional block to represent a data unit size of the initiator functional block.

11. The apparatus of claim 9, wherein the translation logic converts the one or more read requests to a single request if burst information is detected in a first read request and the burst read requests were issued to a target functional block capable of decoding information carried by the single request.

12. The apparatus of claim 9, wherein a distributed arbitration mechanism for the communication fabric implements a pipe-lined arbitration process.

13. A computer readable medium containing instructions stored thereon, which, when executed by a machine, cause the machine to generate a representation of the apparatus of claim 9.

14. A method, comprising:
communicating a single two-dimensional block request fully describing attributes of a two-dimensional data object across a communication fabric in a system on a chip; and
decoding the single two dimension block request to determine the attributes of the two-dimensional data object.

15. The method of claim 14, further comprising:
converting one or more read requests to the single two-dimensional block request if an address of a target is capable of decoding the single two dimension block request.

16. A computer readable medium containing instructions stored thereon, which when executed by a machine cause the machine to perform the method of claim 14.

17. A method, comprising:
converting multiple read requests from a first functional block in a system on a chip (SOC) to a single request that carries how many read requests were combined and an address sequence associated with a non-incrementing address burst type transaction; and
transmitting the single request across a communication fabric in the SOC.

18. The method of claim 17, further comprising:
detecting for a first read request containing burst information that communicates one or more read requests in the non-incrementing address burst type transaction are going to related addresses in a single target; and
converting the multiple read requests into the single request if a target functional block is capable of decoding the single request to determine how many read requests were combined and the address sequence.

19. An apparatus, comprising:
a first instance of translation logic connected to a communication fabric in a system on a chip, wherein the first instance of translation logic to detect for a series of read requests in a burst transaction indicated as a block transaction, wherein a request generated for the block transaction includes annotations indicating a length of a row occupied by a target data, a number of rows occupied by the target data, and an address spacing between two consecutive rows occupied by the target data.

20. The apparatus of claim 19, wherein the first instance of translation logic to also convert the series of read requests into a single request that carries the information communicated by the annotations.

21. A computer readable medium containing instructions stored thereon, which, when executed by a machine, cause the machine to generate a representation of the apparatus of claim 19.

22. The apparatus of claim 19, wherein the length of the row is equal to a width of a two-dimensional object, the number of rows is a height that the two-dimensional object will occupy, and the address spacing between two consecutive rows is a stride of the two-dimensional object.

23. The system of claim 19, further comprising:
a second instance of translation logic to convert the single request into an original number of read requests, where each read request has its original target address.

24. The system of claim 19, further comprising:
a second instance of translation logic to decode annotations in the single request, and to store both the initiator's identification tag and the number of read requests that were combined into the single request.

25. The system of claim 24, further comprising:
a second instance of translation logic to transmit the responses back across the communication fabric based on the stored transaction attributes.

26. An apparatus, comprising:
means for communicating a single block request fully describing attributes of a two-dimensional data object across a communication fabric in a system on a chip; and
means for decoding the single block request to determine the attributes of the two-dimensional data object.

27. An apparatus, comprising:
means for converting multiple read requests from a first functional block in a system on a chip (SOC) to a single request that carries how many read requests were combined and an address sequence associated with a non-incrementing address burst type transaction; and
means for transmitting the single request across a communication fabric in the SOC.

* * * * *